C. J. WHITE.
TRACTOR.
APPLICATION FILED MAR. 3, 1920.
1,374,049.
Patented Apr. 5, 1921.
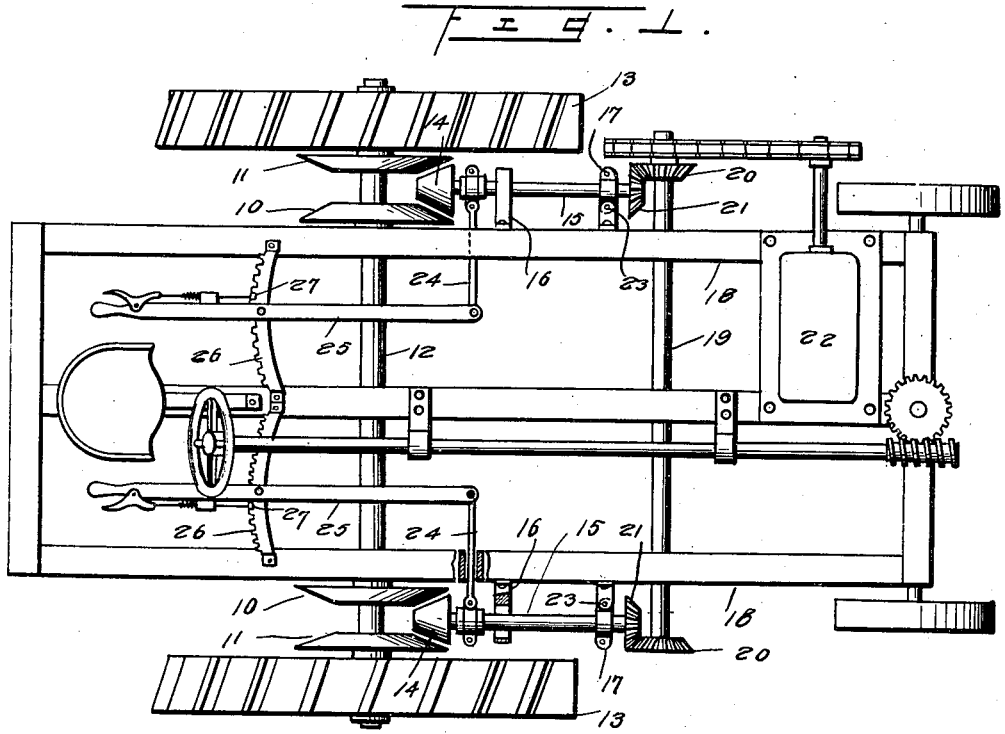
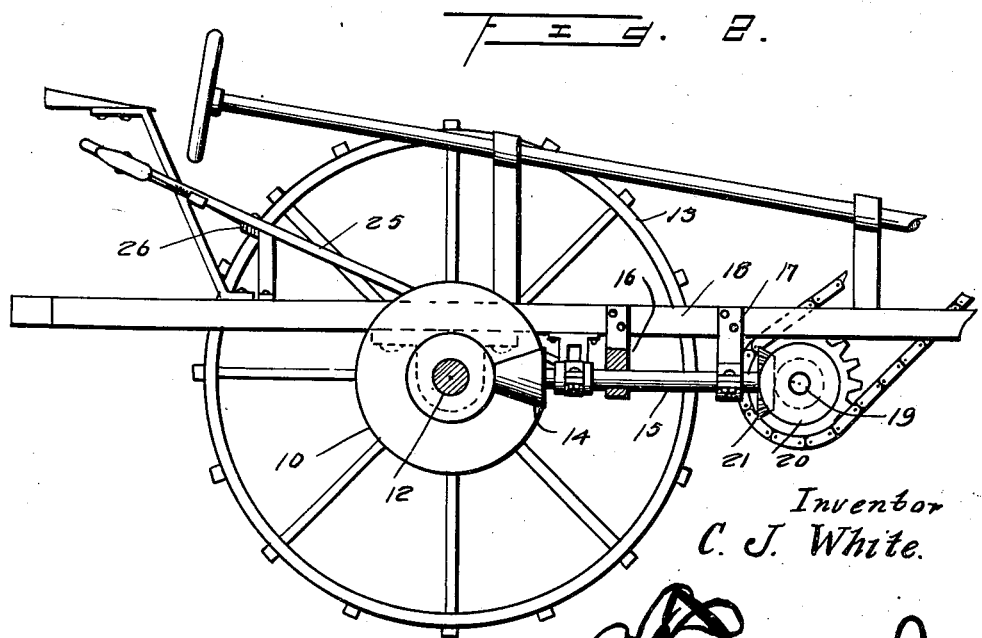
Inventor
C. J. White.

UNITED STATES PATENT OFFICE.

CHARLES J. WHITE, OF LEESVILLE, LOUISIANA.

TRACTOR.

1,374,049.                   Specification of Letters Patent.        Patented Apr. 5, 1921.

Application filed March 3, 1920. Serial No. 362,901.

*To all whom it may concern:*

Be it known that I, CHARLES J. WHITE, a citizen of the United States, residing at Leesville, in the parish of Vernon and State of Louisiana, have invented certain new and useful Improvements in Tractors; and I do hereby declare the following to be a full, clear, and exact description of the invention, such as will enable others skilled in the art to which it appertains to make and use the same.

The object of the invention is to provide a simple, inexpensive and efficient drive particularly adapted for tractors and similar motor cars and vehicles and more especially those wherein the duties of the machine require relatively high power, whereby the transmission of motion from the motor to the drive wheels in order to secure progressive or retrogressive movement is facilitated, and whereby the turning of the vehicle within the minimum space, as for example practically within its own area, or length may be accomplished and with these objects in view the invention consists in a construction and combination of parts of which the preferred embodiment is shown in the accompanying drawing, wherein:

Figure 1 represents a plan view partly in section of the transmission mechanism applied in the operative position to a motor vehicle of the tractor type.

Fig. 2 is a detail sectional view of one of the friction clutch members and related parts.

The drive mechanism consists essentially of a pair of friction disks 10 and 11 disposed in facing relation, concentric with the drive axle 12 upon which are mounted the drive wheels 13, the latter being loosely mounted and having a set of said friction disks, consisting as noted of the oppositely disposed members 10 and 11, secured permanently to the spokes or hub of each wheel and in spaced relation with each other so as to provide for the interposition of the conical friction gear 14 carried by a line or counter-shaft 15 mounted in suitable bearings 16 and 17 supported substantially by the frame 18 of the car or vehicle. These line or counter-shafts receive motion in opposite directions from a drive shaft 19 preferably disposed transversely of and mounted upon the frame and having terminal pinions 20 which are in mesh with corresponding pinions 21 carried respectively by the line or counter-shafts. The driving shaft may be operated from any suitable motor such as that indicated diagrammatically at 22.

The line or counter shafts are capable of a limited lateral swinging movement by reason of having the forward bearing boxes 17 thereof pivoted as indicated at 23, and connected with the said shaft near their rear ends, or adjacent to the friction gears 14 are plunger rods 24 suitably mounted in the frame of the machine and connected with the hand levers 25 which traverse toothed segments 26 and have dogs 27 for engagement with the segments to lock the levers in their adjusted positions and hence lock the friction gears in the desired relation to the friction disks. The movement of the friction gears is sufficient to adapt them to be arranged in engagement with either of the opposing twin disks 10 and 11 or in a neutral position between said disks and out of contact with both of them, and hence by the proper relative adjustment of the parts the motion of the driving shaft may be communicated either to the outside friction disks to drive the machine forward or in contact with the inner disks to drive the machine backward, or in a neutral position in which progressive movement will not be imparted to the machine.

When it is desired to cause the machine to make a short turn the friction gears may be oppositely positioned or adjusted, one in engagement with the outer and the other in engagement with the inner disk, so that progressive movement is communicated to one traction wheel while retrogressive movement is imparted to the other so that the machine will swing upon an axis within its own area, and located substantially mid way between the traction wheels.

The operating levers may readily be arranged within convenient reach of the driver or operator of the machine so that either or both may be grasped for independent or simultaneous adjustment in common or opposite directions, and consequently the movement of the machine may be readily and accurately controlled under conditions adapted to perform functions which are impossible with the driving mechanism now in common use.

What is claimed is:—

1. The combination with the traction wheels of a motor car and a drive shaft for communicating motion thereto, of transmission mechanism consisting of a pair of oppositely disposed facing friction disks carried by each traction wheel, a conical friction gear disposed between the members of each pair of friction disks for contact with either of said members and arranged in an intermediate or neutral position, line or counter-shafts respectively carrying said friction gears and operatively connected with the drive shaft, said line or counter-shafts being mounted for swinging movement in directions perpendicular to the planes of said friction disks, and independent means for imparting swinging movement to the line or counter-shafts to adjust the friction gears relatively to the pairs of friction disks.

2. The combination with the traction wheels of a motor car and a drive shaft for communicating motion thereto, of transmission mechanism consisting of pairs of oppositely disposed complemental friction disks carried respectively by said traction wheels, line or counter-shafts geared to the drive shaft and carrying friction gears interposed respectively between the members of the pairs of friction disks, plungers connected with the line or counter shafts for imparting movement thereto to dispose the friction gears in contact selectively with said friction disks, hand levers connected respectively with said plungers, and means for locking the hand levers in their adjusted positions.

In testimony whereof I affix my signature in presence of two witnesses.

CHARLES J. WHITE.

Witnesses:
O. G. SMITH,
R. G. KORINKER.